(12) United States Patent
Mineur (10) Patent No.: US 12,311,702 B2
(45) Date of Patent: May 27, 2025

(54) TIRE TREAD WITH MULTIPLE CIRCUMFERENTIAL ASYMMETRIES

(71) Applicant: American Tire Engineering, Inc., Minnetonka, MN (US)

(72) Inventor: Mark H. Mineur, Fernandina Beach, FL (US)

(73) Assignee: American Tire Engineering, Inc., Minnetonka, MN (US)

( * ) Notice: Subject to any disclaimer, the term of this patent is extended or adjusted under 35 U.S.C. 154(b) by 0 days.

(21) Appl. No.: 17/517,833

(22) Filed: Nov. 3, 2021

(65) Prior Publication Data

US 2022/0134806 A1 May 5, 2022

Related U.S. Application Data

(60) Provisional application No. 63/109,862, filed on Nov. 4, 2020.

(51) Int. Cl.
*B60C 11/03* (2006.01)

(52) U.S. Cl.
CPC ...... *B60C 11/0304* (2013.01); *B60C 11/0318* (2013.01)

(58) Field of Classification Search
CPC .................................................. B60C 11/0318
See application file for complete search history.

(56) References Cited

U.S. PATENT DOCUMENTS

| | | | |
|---|---|---|---|
| 4,600,456 A | 7/1986 | Oswald | |
| 5,160,383 A | 11/1992 | Gartland et al. | |
| 5,226,999 A | 7/1993 | Dugas | |
| 5,309,965 A * | 5/1994 | Williams | B60C 11/0318 152/209.2 |
| D354,027 S | 1/1995 | Grosskopf | |
| D395,414 S | 6/1998 | Grosskopf et al. | |
| D409,122 S | 5/1999 | Kemp, Jr. et al. | |
| 6,050,313 A | 4/2000 | Tsuda | |
| D481,670 S | 11/2003 | Harden, Jr. et al. | |
| D502,683 S | 3/2005 | Pang et al. | |
| D615,922 S | 5/2010 | Takano | |
| D660,224 S | 5/2012 | Takahashi | |

(Continued)

FOREIGN PATENT DOCUMENTS

| | | |
|---|---|---|
| CA | 2018565 | 12/1990 |
| CN | 301271406 | 6/2010 |

(Continued)

OTHER PUBLICATIONS

EP 0591125 Machine Translation (Year: 1994).*

(Continued)

*Primary Examiner* — Justin R Fischer
*Assistant Examiner* — Wendy L Boss
(74) *Attorney, Agent, or Firm* — Christensen, Fonder, Dardi & Herbert PLLC (57) ABSTRACT

Tire-tread constructions may incorporate multiple circumferential asymmetries. Prime-number values are used for (a) the number of pitches (where a pitch is an individual pattern that is repeated around the circumference of the tire tread); (b) the number of segments of the mold with which the overall tire tread is formed; (c) the number of variations in the lengths of pitches; or (d) the number of variations in the lengths of the segments.

23 Claims, 5 Drawing Sheets

(56) References Cited

U.S. PATENT DOCUMENTS

| | | | |
|---|---|---|---|
| D710,296 S | 8/2014 | Bani Hani et al. | |
| D730,273 S | 5/2015 | Schimmoeller | |
| D732,465 S | 6/2015 | Yamada | |
| 9,108,472 B2 | 8/2015 | Hamanaka | |
| D743,327 S | 11/2015 | Schimmoeller | |
| D766,169 S | 9/2016 | Fujioka | |
| D780,105 S | 2/2017 | Renis | |
| D787,434 S | 5/2017 | Oji | |
| D789,284 S | 6/2017 | Krier et al. | |
| 10,239,360 B2 | 3/2019 | Fujioka | |
| D845,222 S | 4/2019 | Wu | |
| D850,360 S | 6/2019 | Davenport | |
| D858,427 S | 9/2019 | Kochanek | |
| D864,850 S | 10/2019 | Kristen | |
| D870,030 S | 12/2019 | Wang et al. | |
| D875,657 S | 2/2020 | Hiser | |
| D880,407 S | 4/2020 | Schultz et al. | |
| D883,909 S | 5/2020 | Fujioka | |
| D886,033 S | 6/2020 | Kristen | |
| D886,725 S | 6/2020 | Sato | |
| D919,557 S | 5/2021 | Davenport | |
| D930,569 S | 9/2021 | Yu et al. | |
| D931,195 S | 9/2021 | Kristen | |
| D934,786 S | 11/2021 | Kochanek | |
| 2002/0066979 A1* | 6/2002 | Fike | B29D 30/0606 264/297.5 |
| 2005/0006015 A1* | 1/2005 | Richards | B60C 11/0318 152/209.2 |
| 2005/0230020 A1 | 10/2005 | Miyake | |
| 2008/0149241 A1 | 6/2008 | Maruyama | |
| 2008/0305196 A1* | 12/2008 | Yasunaga | B29D 30/0629 425/47 |
| 2009/0301627 A1 | 12/2009 | Manno | |
| 2011/0208488 A1 | 8/2011 | Sakuraba | |
| 2014/0158261 A1 | 6/2014 | Takahashi | |
| 2017/0028781 A1 | 2/2017 | Haseda | |
| 2020/0290299 A1 | 9/2020 | Mineur | |
| 2021/0107245 A1 | 4/2021 | Hosoda | |

FOREIGN PATENT DOCUMENTS

| | | | |
|---|---|---|---|
| CN | 301597375 | 6/2011 | |
| CN | 301693551 | 10/2011 | |
| CN | 301953639 | 6/2012 | |
| CN | 302042765 | 8/2012 | |
| CN | 302605930 | 10/2013 | |
| EM | 002376772-0001 | 12/2013 | |
| EP | 0305617 | 3/1989 | |
| EP | 0464438 A1 | 1/1992 | |
| EP | 579436 A1 * | 1/1994 | B29D 30/0606 |
| EP | 591125 A1 * | 4/1994 | B29D 30/0629 |
| JP | 06055905 A | 3/1994 | |
| JP | H08113014 A | 5/1996 | |
| JP | 2004351970 | 12/2004 | |
| JP | D1246742 | 8/2005 | |
| JP | 2007276556 A | 10/2007 | |
| JP | 4266705 B2 | 5/2009 | |
| JP | 4518657 B2 | 8/2010 | |
| JP | 2014118011 A | 6/2014 | |
| JP | 5934597 B2 | 6/2016 | |
| JP | 2019123448 A | 7/2019 | |
| KR | 100593008 B1 | 6/2006 | |
| KR | 1020100121298 A | 11/2010 | |
| WO | WO2000037270 | 6/2000 | |
| WO | WO-2011093856 A1 * | 8/2011 | B29D 30/52 |
| WO | WO2019037150 A1 | 2/2019 | |
| WO | WO2019142509 A1 | 7/2019 | |
| WO | WO2020190895 A2 | 9/2020 | |
| WO | WO2021188139 A1 | 9/2021 | |
| WO | WO2022098732 | 5/2022 | |

OTHER PUBLICATIONS

Bridgestone R150, Bridgestone Tyres New Zealand, Mar. 4, 2020, https://www.bridgestonetyres.co.nz /commercial/bridgestone-r150, 2 pages.

DR818, Double Road, Wholesale Trailer Tyre Manufacturers, 295/80r22.5 11r22.5 11r24.5 Heavy Truck Tyre Tread Depth, Qingdao QJ Industrial Inc., Shandong, China, https://qandjindustrialgroup.en.made-in-china.com/producl/ DMinFNBGrCrL/China-Whotesale-Trailer-Tyre-Manufacturers-295-80r22-5-11r22-5-11r24-5-Heavy-Truck-Tire-Tread- Depth.html, Feb. 4, 2020, 5 pages.

Dr819, Double Road, Qingdao QJ Industrial Inc., Shandong, China, https://qandjindustrialgroup.en.made-in-china.com/product/wMNnkORPrFYT/China-Smartway-Drive-Steer-Trailer-Truck-Tires-11R24-5-DR819-Heavy-Truck-Tyre-Weight-315-80R22-5-18.html, 8 pages.

G150, Good Stability R-Stone Precur Tire Tread for Semi-Trailer/Trailer Tire, Pattern J30, Jianxin, http://www.tireretreadingmachine.com/sale-10508270-good-stability-r-stone-precur-tire-tread-for-for-semi-trailer-trailer-tire.html, Mar. 4, 2020, 2 pages.

G969, Good Stability R-Stone Precur Tire Tread for Semi Trailer/Trailer Tire, Pattern J30, Jianxin, http://www. ireretreadingmachine.com/sale-10508270-good-stability-r-stone-precur-tire-tread-for-for-semi-trailer-trailer-tire.html, 2 pages.

International Search Report and Written Opinion, from corresponding PCT application No. PCT/US2020/041425, mailed Dec. 9, 2020, 11 pages.

Osborne, David, "The Role of Cap Plies in Steel Belted Radial Tires", 2003, pp. 1-16.

RR706, Ultra-Premium Mixed Service All-Position Tire, Double Coin Tires, Apr. 2, 2020, https://www.doublecointires.com/tire/rr706/, 3 pages.

Wanli Milever Brand, 11r24.5 11r22.5 Trailer Tire on Alibaba.com, SDR06 Closed Shoulder Drive Tire, https://www.alibaba.co/product-detail/wanli-milever-brand=11r24-5-11r22_62010710463.html?spm=a2700.7724857, normalList.31.3aaa67b3lqqQPo, Apr. 3, 2020, 8 pages.

International Search Report and Written Opinion, from corresponding PCT application No. PCT/US2021/057863, mailed Feb. 23, 2022, 10 pages.

DR819, Double Road, Qingdao QJ Industrial Inc., Shandong, China, https://qandjindustrialgroup.en.made-in-china.com/product/wMNnkORPrFYT/China-Smartway-Drive-Steer-Trailer-Truck-Tires-11R24-5-DR819-Heavy-Truck-Tyre-Weight-315-80R22-5-18.html, Jan. 11, 2022, 8 pages.

G969, Good Stability R-Stone Precur Tire Tread for Semi Trailer/Trailer Tire, Pattern J30, Jianxin, http://www. ireretreadingmachine.com/sale-10508270-good-stability-r-stone-precur-tire-tread-for-for-semi-trailer-trailer-tire.html, Apr. 3, 2020, 2 pages.

Mark et al., "Science and Technology of Rubber", Second Edition, Academic Press, 1994, 7 pages.

* cited by examiner

TIRE TREAD WITH MULTIPLE CIRCUMFERENTIAL ASYMMETRIES

CROSS-REFERENCE TO RELATED APPLICATIONS

This application claims the benefit of U.S. Provisional Patent Application No. 63/109,862, filed Nov. 4, 2020, which is hereby fully incorporated herein by reference.

TECHNICAL FIELD

Embodiments described herein generally relate to tires and, more particularly, to truck tires having construction suitable for high-speed, long-distance hauling.

BACKGROUND

More than ever, commercial trucking operators expect long tread life for the type of working conditions under which their tires are used. The tread life of a tire depends on myriad factors, including material composition of the tread, the heat-dissipation capability of the tire, the tread pattern, and the overall construction of the tire tread and casing.

In addition, the tread life is dependent on the extent to which the design and construction of the tire corresponds to the type of usage that the tire experiences. For instance, tires intended for use on poor road surfaces and with irregular loading practices tend to be optimized for ruggedness, whereas tires intended for use on good road surfaces and high speed tend to be optimized for heat dissipation. Furthermore, tires intended for higher speed usage are more susceptible to certain other factors that can dramatically affect their tread life. Higher speeds can exacerbate undesired mechanical effects such as harmonic oscillations resulting from repeating patterns inherent in the tire tread or overall tire construction, which can result in uneven wear characteristics that, in turn, further accelerate the tread wear.

SUMMARY

Some aspects of this disclosure are directed to tire-tread constructions that reduce tread wear and improve the service life of the tire. In some embodiments, the construction of the tread incorporates multiple circumferential asymmetries. In examples of such embodiments, prime-number values are used for (a) the number of pitches (where a pitch is an individual pattern that is repeated around the circumference of the tire tread); (b) the number of segments of the mold with which the overall tire tread is formed; (c) the number of variations in the lengths of pitches; or (d) the number of variations in the lengths of the segments.

For instance, a given tire may have m pitches, n segments, p different lengths of segments, and q different pitch lengths, where m, n, p, and q are each a prime number greater than 2. In a related example, at least three parameters from among m, n, p, and q are prime numbers greater than 2.

DETAILED DESCRIPTION

One aspect of the embodiments is directed to a truck tire having a construction optimized for the drive wheel position of a tractor truck. Another aspect is directed to a truck tire having a construction optimized for a non-driven wheel position of a tractor truck. Related aspects are directed to various structural features of a tire that serve to reduce or eliminate harmonic oscillations of that tire when it is in use. Although these structural features are described in this disclosure in the context of truck tires, it will be understood that the same or similar features may be suitably adapted for use on passenger car tires, light truck tires, performance tires, and other types of tires.

Figure 1:
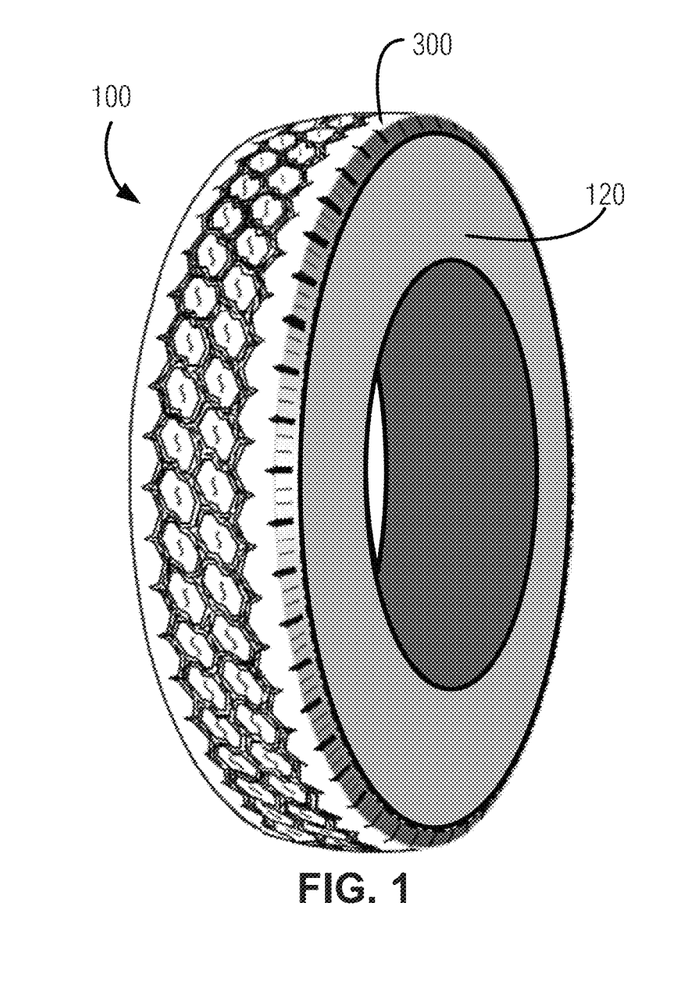
FIG. 1 is a perspective-view diagram illustrating a portion of a drive tire having a casing and a tread formed over the casing according to some embodiments.

FIG. 1 is a perspective-view diagram illustrating a portion of a drive tire 100 having casing 120 and a tread 300 formed over the casing 120. Casing 120 includes conventional features that are not specifically shown, such as a body ply comprising one or more layers of fabric cords, a pair of beads, each including a hoop of high-tensile steel wires wrapped in a loop of the body ply, sidewall reinforcement, and a set of reinforcing belts made from steel cords, all encapsulated in a rubber tire body. Tread 300 has a pattern that is optimized for a drive-position wheel according to an example embodiment.

Figure 2:
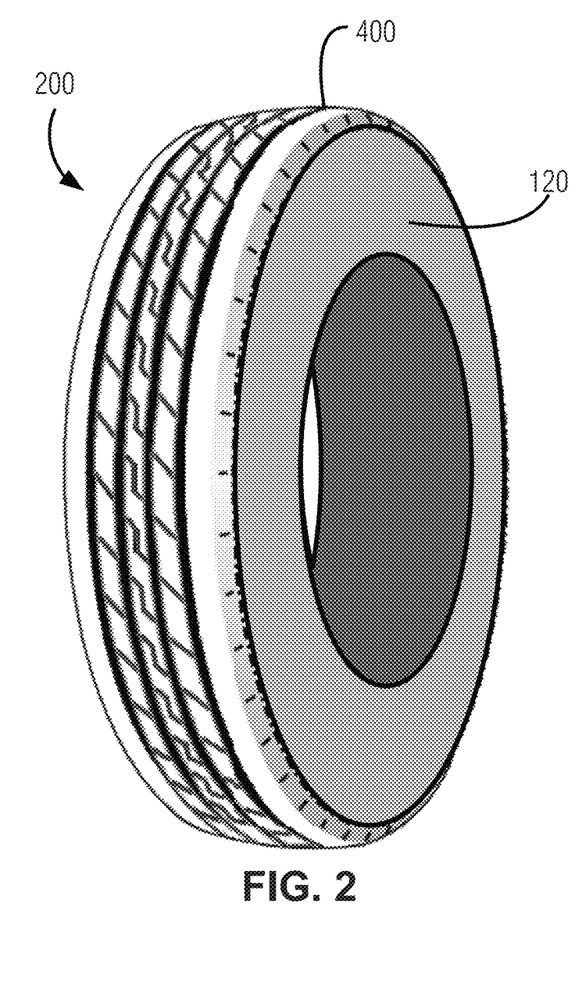
FIG. 2 is a perspective-view diagram of a non-drive tire having a casing and a tread formed over that casing, according to related embodiments.

FIG. 2 is a perspective-view diagram of a non-drive tire 200 having casing 120 and a tread 400 formed over the casing 120. Tread 300 has a pattern that is optimized for a non-drive-position wheel according to an example embodiment.

Figure 3:
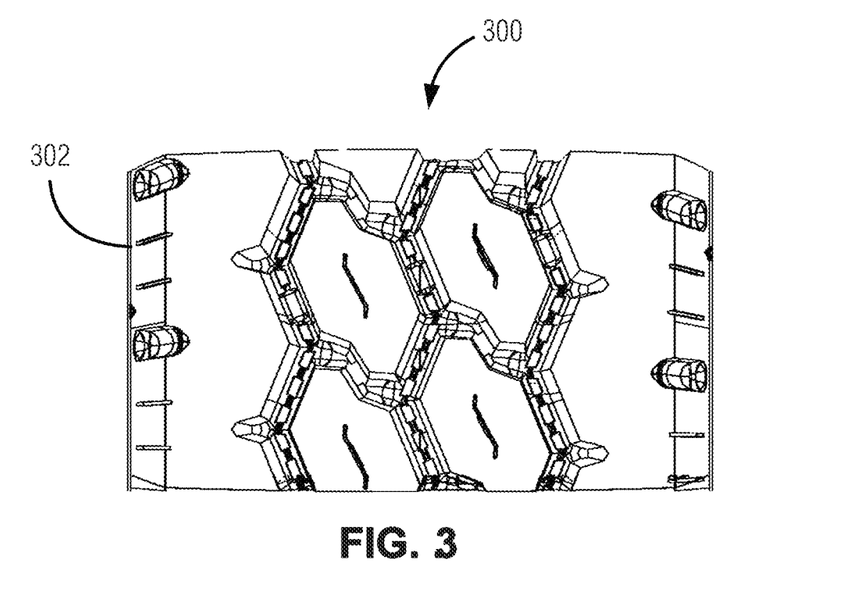
FIG. 3 is a diagram illustrating an individual pitch of the tire of FIG. 1 according to an example.
Figure 4:
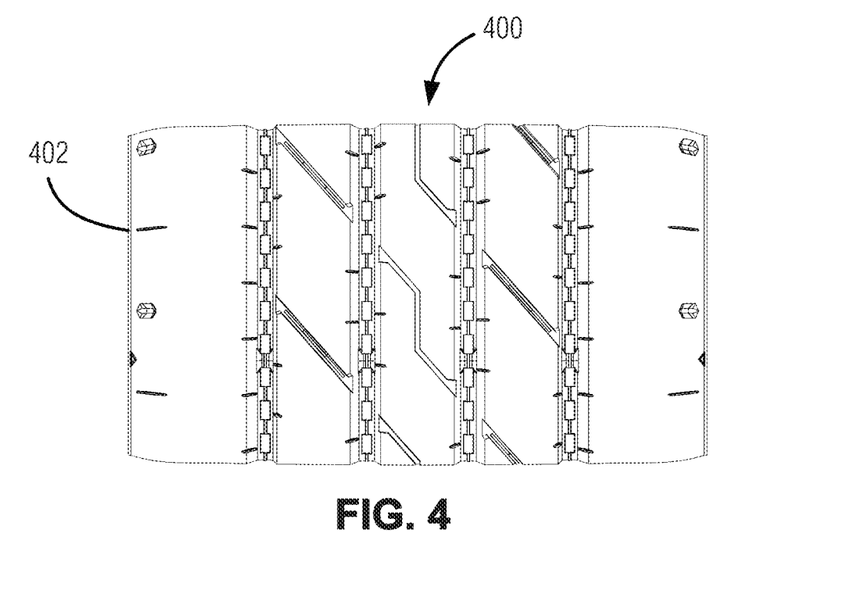
FIG. 4 is a diagram illustrating an individual pitch of tire of FIG. 2 according to an example.

FIG. 3 is a diagram illustrating an individual pitch 302 of tire tread 300. Pitch 302 has a portion of the tread pattern which is repeated around the circumference of the tire. FIG. 4 is a diagram illustrating an individual pitch 402 of tire tread 400. In some embodiments, tire tread 300, 400 is composed of a quantity of pitches, m, where m is a prime number greater than two. In some examples, m is a prime number greater than 22 and less than 98. In some such examples, m is a prime number greater than 36 and less than 64.

In some related examples, tire tread 300, 400 has a quantity q of different pitch lengths. In some such examples, q is a prime number greater than 2. For instance, in some embodiments, q is a prime number greater than 2 and less than 14.

Figure 5:
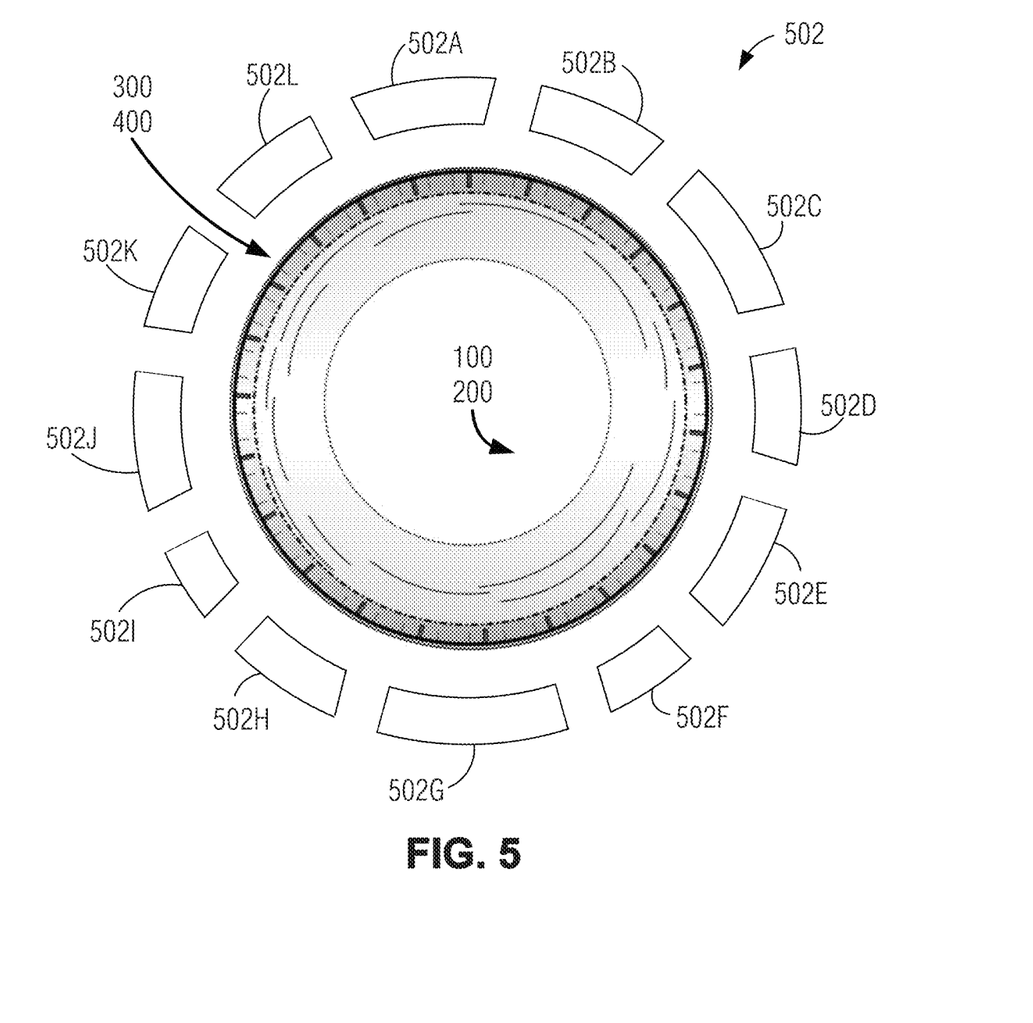
FIG. 5 is a simplified diagram illustrating a fabrication arrangement for forming a tread as part of a tire according to some examples.

FIG. 5 is a simplified diagram illustrating a fabrication arrangement for forming tread 300 or tread 400 as part of tire 100, 200. A mold 502 includes circumferential sections 502A-502L, each of which has a corresponding portion of tread pattern on an interior surface. During fabrication, the multilayer tire structure (including an uncured, "green," rubber composition to be formed into the tread) is pressed and heated inside the assembled circumferential sections 502A-502L of mold 502 to be shaped and cured.

As an undesirable consequence of the use of multiple circumferential sections 502A-502L of mold 502, tread 300 or 400 has physical variations corresponding to the locations of the circumferential sections. These physical variations may cause a corresponding interaction with the road surface when the tire rolls over that surface. If there is a repeating pattern among such variations, a harmonic resonance may occur, which can result in uneven tread wear. In similar principle, repeating patterns in the tread pattern of the pitches can also cause harmonic resonances to occur under certain conditions.

In some embodiments, asymmetries are designed into the tread to avoid such harmonic oscillations. In some examples, circumferential sections 502A-502L have various different lengths. In one such embodiment, mold 502 has a quantity p of different lengths of tire segments. In related embodiments, p is a prime number greater than 2. For instance, in some embodiments, p is a prime number greater than 2 and less than 14. In the example shown in FIG. 5, there are 12 segments. In other embodiments, the quantity of segments, n, is a prime number greater than 2. In some such examples, n is a prime number greater than 6 and less than 18.

Figure 6:
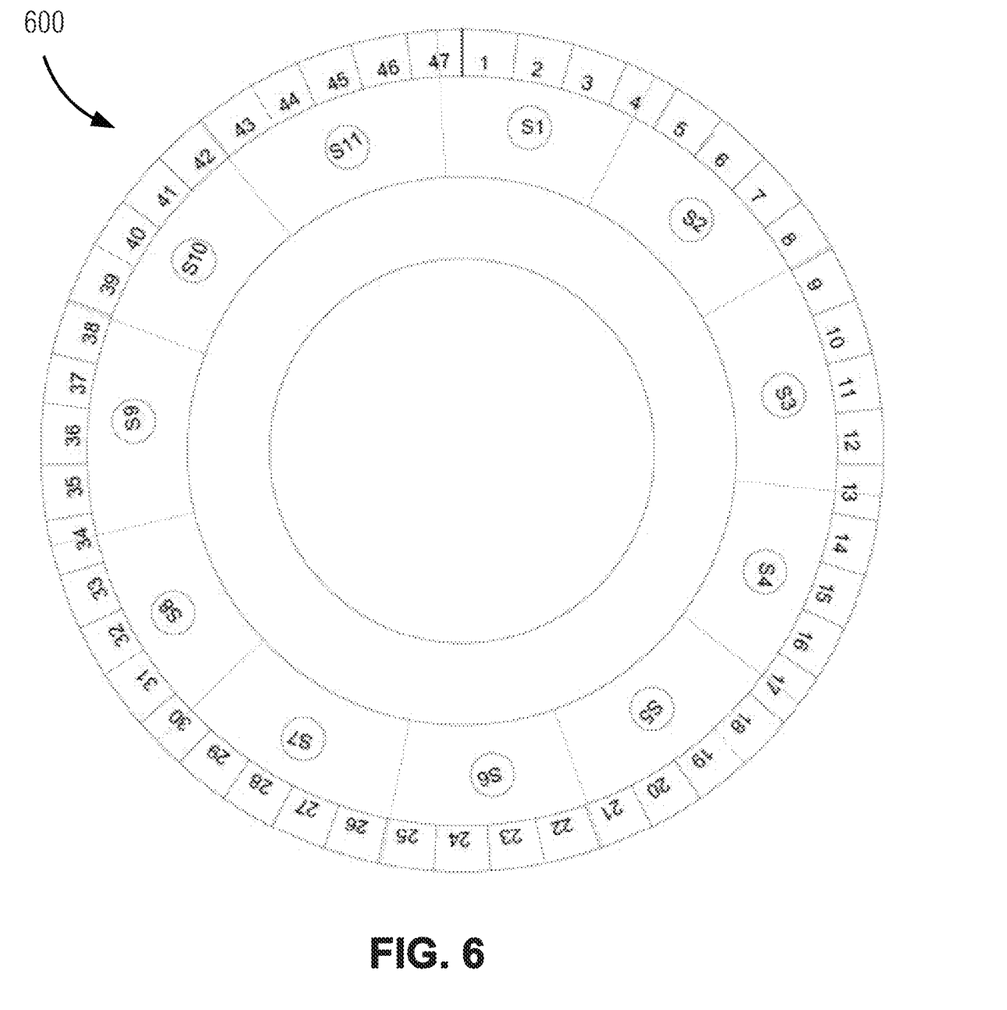
FIG. 6 is a diagram illustrating an example set of parameters for a particular embodiment of a tire tread according to some embodiments.

FIG. 6 is a diagram illustrating an example set of parameters for a particular embodiment of tread 600. As depicted, tread 600 is formed from a mold having a quantity n of mold segments, the segments being labeled S1-S11. In this example, n is 11. Also, as depicted, tread 600 is made up of quantity m of pitches, where m is 47 and the pitches are numbered 1-47. As shown, the segment boundaries do not necessarily align with the pitch boundaries. For instance, the boundaries of segment S4 fall within pitches 13 and 17.

Figure 7:
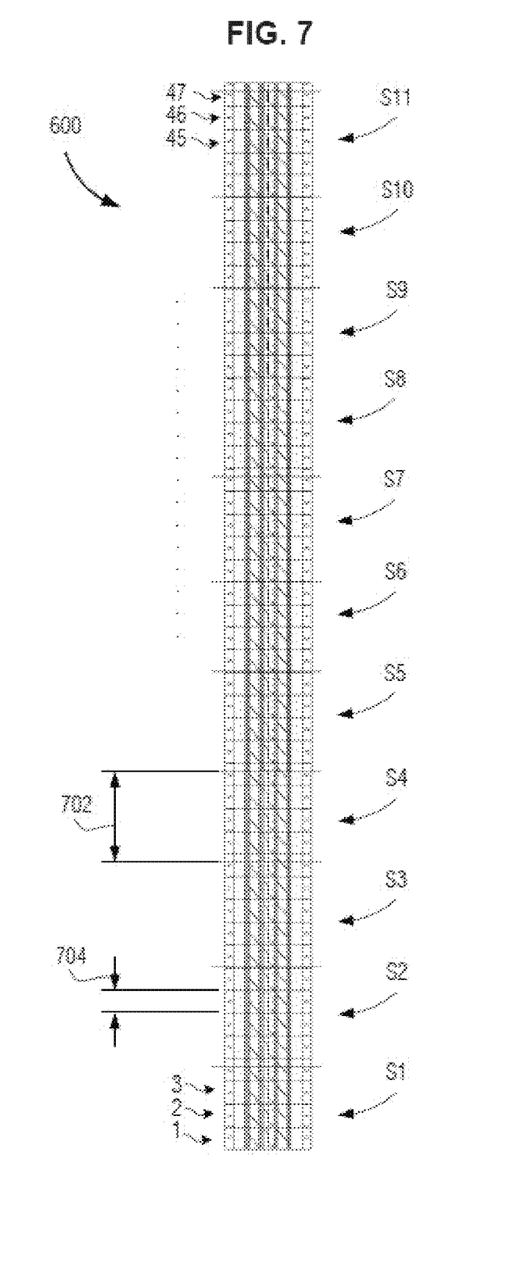
FIG. 7 is a diagram mapping the tread illustrated in FIG. 6 into a 2-dimensional representation for further illustration.

FIG. 7 is a diagram mapping tread 600 into a 2-dimensional representation for further illustration. Segments S1-S11 are shown as indicated, with boundary lines added to show their positions and lengths. Segment length 702 represents a distance between two adjacent segment boundary lines. Pitches 1-47 are also shown, with their own corresponding boundary lines. Pitch length 704 represents a distance between two adjacent pitch boundary lines. In this example, tread 600 has p=5 different segment lengths, with the various segment lengths distributed around the circumference (or length) of tread 600. Tread 600 has q=3 different pitch lengths, with the various pitch lengths distributed around the circumference (or length) of tread 600.

In related embodiments, the segment lengths are distributed generally uniformly around the circumference (or length) of tread 600. In related embodiments, the pitch lengths are distributed generally uniformly around the circumference (or length) of tread 600.

In these examples, the use of prime numbers and generally uniform distributions of the various segment lengths and the various pitch lengths throughout the circumference or length of tread 600 serves to avoid repeating patterns around the tire that might set up a harmonic resonance when the tire rolls at any particular vehicle speed.

Table 1 below illustrates various combinations of parameter values according to some embodiments.

TABLE 1

| Embodiment Type | Qty Pitches m | Qty Segments n | Qty Different Segment Lengths p | Qty Different Pitch Lengths q |
|---|---|---|---|---|
| A | Prime Number > 2 | Prime Number > 2 | Prime Number > 2 | Prime Number > 2 |
| B |  | Prime Number > 2 | Prime Number > 2 | Prime Number > 2 |
| C | Prime Number > 2 |  | Prime Number > 2 | Prime Number > 2 |
| D | Prime Number > 2 | Prime Number > 2 |  | Prime Number > 2 |
| E | Prime Number > 2 | Prime Number > 2 | Prime Number > 2 |  |

In embodiment types A-E of Table 1, at least three of the four values of m, n, p, and q are prime numbers greater than 2.

Additional Notes and Examples

Example 1 is a tire comprising: a casing; and a molded tread formed over the casing, the tread having been formed with a plurality n of mold segments, the tread including a plurality m of pitches, wherein each of the m pitches is a portion of a tread pattern that is repeated along a circumference of the tire; wherein each of the n mold segments has a corresponding segment length and each of the m pitches has a pitch length; wherein the plurality n of mold segments includes, mold segments of a plurality p different lengths; wherein the plurality m of pitches includes pitches of q different lengths; and wherein at least three of m, n, p, and q are prime-number values greater than 2.

In Example 2, the subject matter of Example 1 includes, wherein m is a prime number greater than 22 and less than 98.

In Example 3, the subject matter of Example 2 includes, wherein m is a prime number greater than 36 and less than 64.

In Example 4, the subject matter of Example 3 includes, wherein m is 47.

In Example 5, the subject matter of Examples 1-4 includes, wherein n is a prime number greater than 6 and less than 18.

In Example 6, the subject matter of Example 5 includes, wherein n is 11.

In Example 7, the subject matter of Examples 1-6 includes, wherein p is a prime number greater than 2 and less than 14.

In Example 8, the subject matter of Example 7 includes, wherein p is 5.

In Example 9, the subject matter of Examples 1-8 includes, wherein q is a prime number greater than 2 and less than 14.

In Example 10, the subject matter of Example 9 includes, wherein q is 3.

In Example 11, the subject matter of Examples 1-10 includes, wherein m is 47, n is 11, p is 5, and q is 3.

In Example 12, the subject matter of Examples 1-11 includes, wherein m is 47, n is 12, p is 5, and q is 3.

In Example 13, the subject matter of Examples 1-12 includes, wherein each of the n mold segments has segment boundaries along the circumference of the tread, and wherein each of the m pitches has pitch boundaries along the circumference of the tread; and wherein at least one of the segment boundaries is situated between two adjacent pitch boundaries; and wherein at least one of the pitch boundaries is situated between two adjacent segment boundaries.

In Example 14, the subject matter of Examples 1-13 includes, wherein the pitch length is distributed generally uniformly around the circumference of the tread.

Example 15 is a tire comprising: a casing; and a molded tread formed over the casing, the tread having been formed with a plurality n of mold segments, the tread including a plurality m of pitches, wherein each of the m pitches is a portion of a tread pattern that is repeated along a circumference of the tire; wherein each of the n mold segments has a corresponding segment length and each of the m pitches has a pitch length; wherein the plurality n of mold segments includes, mold segments of a plurality p different lengths; and wherein m, n, and p are each a prime-number value greater than 2.

In Example 16, the subject matter of Example 15 includes, wherein m is a prime number greater than 22 and less than 98.

In Example 17, the subject matter of Example 16 includes, wherein m is a prime number greater than 36 and less than 64.

In Example 18, the subject matter of Example 17 includes, wherein m is 47.

In Example 19, the subject matter of Examples 15-18 includes, wherein n is a prime number greater than 6 and less than 18.

In Example 20, the subject matter of Example 19 includes, wherein n is 11.

In Example 21, the subject matter of Examples 15-20 includes, wherein p is a prime number greater than 2 and less than 14.

In Example 22, the subject matter of Example 21 includes, wherein p is 5.

In Example 23, the subject matter of Examples 15-22 includes, wherein m is 47, n is 11, and p is 5.

In Example 24, the subject matter of Examples 15-23 includes, wherein each of the n mold segments has segment boundaries along the circumference of the tread, and wherein each of the m pitches has pitch boundaries along the circumference of the tread; and wherein at least one of the segment boundaries is situated between two adjacent pitch boundaries; and wherein at least one of the pitch boundaries is situated between two adjacent segment boundaries.

In Example 25, the subject matter of Examples 15-24 includes, wherein the pitch length is distributed generally uniformly around the circumference of the tread.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A tire comprising:
   a casing; and
   a molded tread formed over the casing, the molded tread having been formed with a plurality n of mold segments, such that the molded tread includes a plurality of n tread segments with pairs of adjacent tread segments of the plurality of n tread segments defining a segment boundary therebetween, the plurality of n tread segments having a plurality p of different circumferential segment lengths, the molded tread also including a plurality m of pitches, wherein each of the m pitches is a portion of a tread pattern that is repeated along a circumference of the tire, and pairs of adjacent pitches of the plurality m of pitches define a pitch boundary therebetween;
   wherein the plurality m of pitches includes pitches of q different lengths;
   wherein at least three of the four pluralities n, m, p and q are prime-number values greater than 2, and
   wherein a majority of tread segment boundaries do not circumferentially align with a corresponding pitch boundary.

2. The tire of claim 1, wherein m is a prime number greater than 22 and less than 98.

3. The tire of claim 2, wherein m is a prime number greater than 36 and less than 64.

4. The tire of claim 3, wherein m is 47.

5. The tire of claim 1, wherein q is a prime number greater than 2 and less than 14.

6. The tire of claim 5, wherein q is 3.

7. The tire of claim 1, wherein m is 47 and q is 3.

8. The tire of claim 1, wherein the pitch length is distributed uniformly around the circumference of the tread.

9. A tire comprising:

a casing; and a molded tread formed over the casing, the molded tread having been formed with a plurality n of mold segments, such that the molded tread includes a plurality of n tread segments with pairs of adjacent tread segments of the plurality of n tread segments defining a segment boundary therebetween, the plurality of n tread segments having a plurality p of different circumferential segment lengths, the molded tread also including a plurality m of pitches, wherein each of the m pitches is a portion of a tread pattern that is repeated along a circumference of the tire, and pairs of adjacent pitches of the plurality m of pitches define a pitch boundary therebetween;

wherein each of the n tread segments has a corresponding segment length and each of the m pitches has a pitch length;

wherein the plurality n of tread segments includes tread segments of a plurality p different lengths;

wherein the plurality m of pitches includes pitches of q different lengths;

wherein m, q and p are each a prime-number value greater than 2;

wherein a plurality of tread segment boundaries do not circumferentially align with a corresponding pitch boundary; and wherein the molded tread includes a plurality of physical variations caused by the plurality of mold segments, each of the plurality of physical variations corresponding to a tread location of one of the plurality n of mold segments, and wherein the plurality of physical variations forms an asymmetrical pattern about the tire circumference due to the plurality n of mold segments and the plurality q of different tread segment lengths being prime-number values greater than 2, so as to avoid undesirable tire harmonic resonance and uneven tread wear.

10. The tire of claim 9, wherein m is a prime number greater than 22 and less than 98.

11. The tire of claim 10, wherein m is a prime number greater than 36 and less than 64.

12. The tire of claim 11, wherein m is 47.

13. The tire of claim 9, wherein n is a prime number greater than 6 and less than 18.

14. The tire of claim 13, wherein n is 11.

15. The tire of claim 9, wherein p is a prime number greater than 2 and less than 14.

16. The tire of claim 15, wherein p is 5.

17. The tire of claim 9, wherein m is 47, n is 11, and p is 5.

18. The tire of claim 9, wherein the pitch length is distributed uniformly around the circumference of the tread.

19. The tire of claim 9, wherein q is a prime number greater than 2 and less than 14.

20. The tire of claim 19, wherein q is 3.

21. The tire of claim 9, wherein m is 47, n is 11, p is 5 and q is 3.

22. The tire of claim 9, wherein m is 47, n is 12, p is 5 and q is 3.

23. The tire of claim 9, wherein a majority of tread segment boundaries do not circumferentially align with a corresponding pitch boundary.

\* \* \* \* \*